United States Patent [19]

Bleckmann et al.

[11] Patent Number: 4,750,126

[45] Date of Patent: Jun. 7, 1988

[54] METHOD AND A DEVICE FOR MONITORING AN ANTISKID SYSTEM

[75] Inventors: Hans W. Bleckmann, Frankfurt am Main, Fed. Rep. of Germany; Heinz Loreck, Molding, Austria

[73] Assignee: ITT Industries, Inc., New York, N.Y.

[21] Appl. No.: 466,261

[22] Filed: Feb. 14, 1983

Related U.S. Application Data

[63] Continuation-in-part of Ser. No. 214,385, Dec. 8, 1980, abandoned.

[30] Foreign Application Priority Data

Dec. 21, 1979 [DE] Fed. Rep. of Germany ....... 2951753

[51] Int. Cl.$^4$ .............................................. B60T 8/34
[52] U.S. Cl. .................................. 364/426; 318/383
[58] Field of Search ................... 364/426; 318/52, 383; 361/238; 180/197; 303/10, 11, .91, 93, 103; 340/52

[56] References Cited

U.S. PATENT DOCUMENTS

| | | | |
|---|---|---|---|
| 4,313,166 | 1/1982 | Rode et al. | 364/426 |
| 4,335,431 | 6/1982 | Takahashi | 364/426 |
| 4,338,668 | 7/1982 | Cook | 364/426 |
| 4,393,447 | 7/1983 | Loreck | 364/426 |

FOREIGN PATENT DOCUMENTS 2068146  8/1981  United Kingdom ................ 364/426

Primary Examiner—Bentsu Ro
Attorney, Agent, or Firm—James B. Raden; Robert P. Seitter

[57] ABSTRACT

To avoid dangerous pressure decreases in antiskid systems, it is necessary to continuously monitor the operability of the electrical components. The present invention ensures maximum reliablity and a simple circuit configuration. Electrical signals are generated during the period of time in which a pressure decrease occurs and/or by the speed of pressure decrease at each wheel of a vehicle axis and are subtracted from one another. If the absolute value of the difference reaches a limiting value, the disturbed part of the system will be prevented from causing a further pressure decrease.

4 Claims, 2 Drawing Sheets

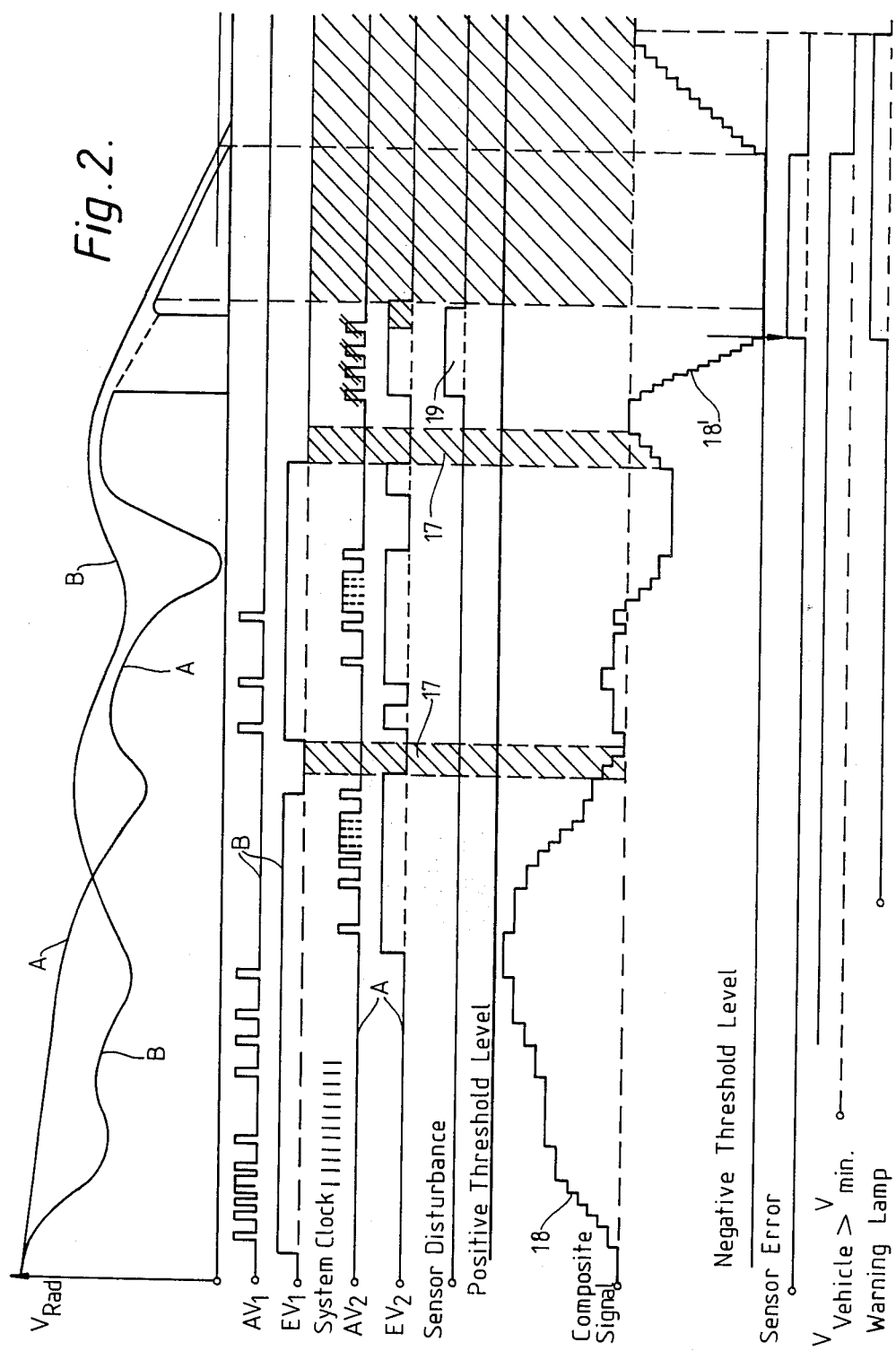

METHOD AND A DEVICE FOR MONITORING AN ANTISKID SYSTEM

CROSS-REFERENCE TO RELATED APPLICATIONS

This is a continuation-in-part application of prior application Ser. No. 214,385, filed Dec. 8, 1980, now abandoned.

BACKGROUND OF THE INVENTION

The present invention relates to a method and a device for monitoring an antiskid system for signalling disturbances.

In antiskid systems it is necessary to continuously monitor the operability of the sensors provided at the wheels, and of measuring and control circuits as well as the associated connecting lines, because disturbances or interrupted signal paths may lead to faulty and hazardous pressure drops in the brake cylinders associated with the wheels.

SUMMARY OF THE INVENTION

Accordingly, it is an object of the present invention to provide a monitoring method and a monitoring device for parts of the antiskid system which ensures maximum reliability, ease of implementation and prompt error indication.

A feature of the present invention is the provision of a method of monitoring an antiskid system for signalling disturbances comprising the steps of providing two signals each associated with a different wheel of a vehicle axle indicating a given characteristic, such as the duration and steepness of a pressure decrease at an associated one of the wheels; subtracting and accumulating the two signals to provide a composite signal; producing an error signal when the composite signal attains one of an upper threshold level and a lower threshold level of a predetermined tolerance range; and utilizing the error signal to de-energize a component of the antiskid system to prevent a further pressure decrease.

Utilizing the fact that pressure buildup and pressure decrease in the brake cylinders of any wheel occur in essence under the control of signals arriving from the associated sensors, and considering that during undisturbed controlled braking operations the composite signal invariably remains within a tolerance range determinable by empirical values, monitoring of not only the sensors, but also at the same time of the measuring circuit as well as a major part of the control circuit is ensured in a surprisingly simple manner.

Preferably the composite signal is limited to the level of the threshold attained when one of the thresholds of the tolerance range is reached. It is thereby ensured that the signal can never become greater than the error limit provided, whereby the resent time of the signal is also defined.

During a control cycle the composite signal is preferably reduced toward zero value whenever the two inlet valves of the associated brake cylinders are not electrically excited, i.e., open, at the same time. The error signal is reset when the vehicle speed drops below a predeterminable minimum speed and the composite signal has reached zero value.

In a particularly advantageous embodiment of the method of the present invention, in the event of a sudden failure of the signal representative of the wheel speed, the rise speed of the composite signal is increased toward the tolerance limits so that the respective threshold level is attained particularly rapidly as a result of which the period of time until the error condition is detected is substantially reduced, thereby contributing to an increased safety.

As an alternative to, or simultaneous with, this method to increase the rise speed of the signal representative of a pressure fall, it is also possible to substantially reduce the tolerance range for the composite signal.

Preferably, a sudden signal failure is sensed by the detection of an inadmissibly high level change of the associated velocity or acceleration signal, this signal being easily obtainable in antiskid systems in addition to being suitable for further purposes.

By limiting in such a method the count rate to a maximum value by means of a predetermined system clock, it is possible to count pulses, i.e., the pulses of the system clock, with an outlet valve continuously excited. It is thereby ensured that with an outlet valve continuously excited, i.e., with the arrangement operative, the composite signal does not leave the tolerance range to signal a non-existent disturbance.

Another feature of the present invention is the provision of a circuit for monitoring signalling disturbances in an antiskid system having a brake cylinder for each wheel of a vehicle axle controlled by an inlet valve to control pressure buildup therein and an outlet valve to control pressure decrease therein, the inlet and outlet valves being controlled by pulse trains generated in response to rotational speed of an associated one of the wheels comprising a subtractor and accumulator stage having applied to one input thereof positive count clock pulses responsive to opening pulses for the outlet valve of one of the wheels and having applied to another input thereof negative count clock pulses responsive to opening pulses for the outlet valve of the other of the wheels; a threshold circuit coupled to the output of the stage having a positive threshold level and a negative threshold level defining a predetermined tolerance range; and an error indicator connected to the output of the threshold circuit.

This arrangement is of simple construction and affords at the same time flexibility with regard to the accomplishment of optimum functions, because it permits the conversion of the opening pulses for the outlet valves into clock or count pulses, optimization of the composite signal pattern both in the presence and absence of opening pulses, and in particular enables control of the rise speed of the composite signal by variation of the count rate, if this is necessary with a view to obtaining a quick response of the arrangement.

Finally, it is another characteristic feature of the present invention that the opening signals for the outlet valves of an axle or of a wheel are passed through a gate which is controlled in response to the output signal of the threshold stage. This enables the antiskid system to be selectively disabled for one axle or one wheel while the remaining part of the whole system, which operates properly, is allowed to remain in operation.

BRIEF DESCRIPTION OF THE DRAWING

Above-mentioned and other features and objects of this invention will become more apparent by reference to the following description taken in conjunction with the accompanying drawing, in which:

FIG. 2 illustrates time diagrams useful in explaining the operation of the circuit of FIG. 1.

DESCRIPTION OF THE PREFERRED EMBODIMENT

Figure 1:
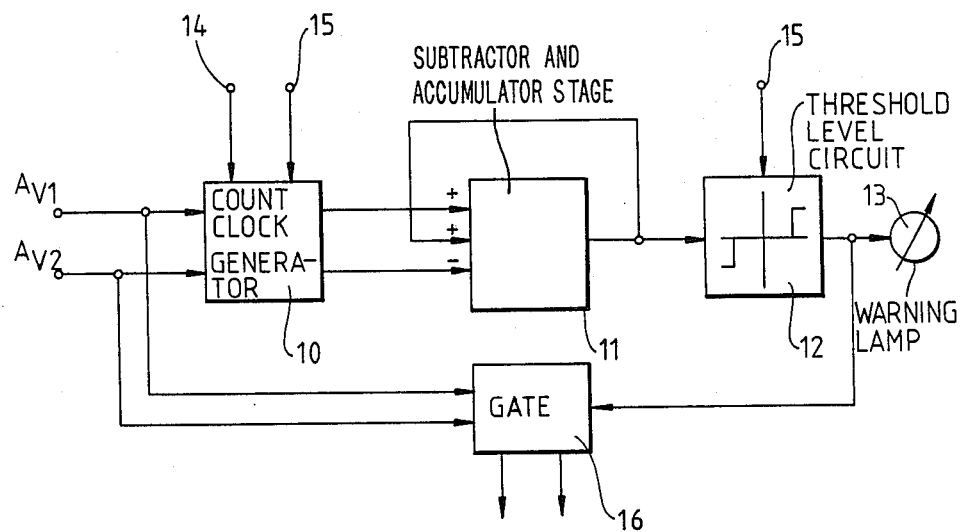
FIG. 1 is a block diagram of a circuit configuration for implementing the method in accordance with the principles of the present invention.

Referring to FIG. 1, a count clock generator 10 has applied to it the opening pulses $A_{V1}$ and $A_{V2}$ for the pressure-relief valves of the wheel brake cylinders of two vehicle wheels arranged on one axle. Count clock generator 10 is of such a configuration that it issues count clock pulses at each of its two outputs on the occurrence of pulses $A_{V1}$ and $A_{V2}$, respectively, these output pulses being subtracted in a subsequent subtractor and accumulator stage 11. Stage 11 preferably is digital and may include an up-down counter responsive to the count clock from generator 10 produced by pulses $A_{V1}$ to count up and responsive to the count clock from generator 10 produced by pulses $A_{V2}$ to count down, a positive signal source responsive to each up count to provide a positive signal output, a negative signal source responsive to each down count to provide a negative signal output, first and second storage devices each coupled to a different one of the positive and negative signal sources to accumulate the positive and negative signals coupled thereto and a combining arrangement to cause the negative signals in the appropriate one of the first and second storage devices to be subtracted from the positive signals in the other of the first and second storage devices to produce the composite signal 18 of FIG. 2. Stage 11 is followed by a threshold level circuit 12 which will issue an output signal to a subsequent indicating device, such as warning lamp 13, only if the signal arriving from stage 11 reaches the positive or negative threshold level.

Via a system clock input terminal 14 of count clock generator 10, the maximum possible count rate at the maximum pulse repetition rate of signals $A_{V1}$ and $A_{V2}$ is predetermined a system clock.

Via another control input terminal 15, count clock generator 10 is abruptly shiftable to a higher count rate in order to reduce, in the event of a sudden signal failure, the system reaction time for detection of an error condition. In this arrangement, control input terminal 15 may have applied to it a signal from the speed-measuring circuit (not shown) representative of an inadmissibly high level change of the velocity or acceleration signal, such as, for example, produced by rupture of a wire in the speed measuring circuit (not shown). This signal could be a signal which when combined with the system clock at terminal 14 results in a clock signal having a higher count rate than the system clock.

With the same objective in mind, the control signal representative of the inadmissibly high level change of the velocity or acceleration signal at terminal 15 of generator 10, also drives a control input terminal of threshold stage 12 likewise assigned reference numeral 15 in order to substantially reduce the threshold levels.

Prior to being delivered to the outlet valves, opening signals $A_{V1}$ and $A_{V2}$ are passed through a gate 16 which is open during a control cycle but which on the occurrence of an error signal at the output of threshold stage 12 is blocked. This means that in the event of an error condition a pressure decrease in the brake cylinders associated with one axle is immediately inhibited, while the function of the antiskid system is maintained for the other axle where error-free operation continues to be possible. This is accomplished by having a circuit like that shown in FIG. 1 connected to outlet valve opening signals of each axle. Thus, only gate 16 will be blocked preventing passage of the associated valve opening signals causing an error indicating, and, hence, inhibiting a further pressure decrease in the brake cylinders of the associated axle.

Referring to FIG. 2 which serves to explain by way of example the mode of operation of the block diagram of FIG. 1, the velocity patterns of two vehicle wheels A and B arranged on one axle is plotted against time during a control cycle.

Below these velocity patterns are shown the pulse trains $A_{V1}$ and $E_{V1}$ for the respective outlet and inlet valve of the brake cylinder of vehicle wheel B, and the pulse trains $A_{V2}$ and $E_{V2}$ for the respective outlet and inlet valve of the brake cylinder of vehicle wheel A.

Pulse trains $A_{V1}$ and $A_{V2}$ destined for the outlet valves are processed in the manner already explained with reference to FIG. 1, with step-wave 18 being provided by count clock generator 10 and stage 11. The step-wave 18 is continuously monitored by means of threshold stage 12 to establish whether it remains within the tolerance range defined by a positive error threshold and a negative error threshold. If step-wave signal 18 reaches the threshold of the tolerance range, this is indicative of the existance of an error condition, and accordingly a sensor of line fault is signalled at this moment and a further pressure decrease in the associated brake cylinders is stopped.

In subtractor and accumulator stage 11, signal 18 is generated in accordance with specific conditions from drive signals $A_{V1}$ and $A_{V2}$ of the outlet valves and a predetermined system clock. A count clock is generated only on each arrival of a drive signal and a system clock. In practice, this could be realized, for example, by having two flip flops each set by a different one of the drive signal $A_{V1}$ and $A_{V2}$ and reset by a system clock, with the trailing edge of the output of each of the flip flops, for example, forming or generating an associated count clock.

The diagrams of FIG. 2 show that in the presence of openign pulses $A_{V1}$ and a system clock, the counter in stage 11 counts in the positive or upward direction and in the presence of opening pulses $A_{V2}$ and a system clock, the counter in stage 11 counts in the negative or downward direction resulting in the stepped composite signal 18.

If neither signals $A_{V1}$ nor signals $A_{V2}$ are present and if the inlet valves are closed as shown by the curves $E_{V1}$ and $E_{V2}$, signal 18 will be made to approach zero value in accordance with another predetermined count clock, e.g., the system clock. This is the case in the shaded areas 17.

If a disturbance occurs during a control cycle as is indicated by the practically impossible, abrupt fall of the velocity of wheel A, this is equivalent to a sensor disturbance 19 as a result of which signal 18 reaches the threshold level and a sensor error is signalled causing the outlet valves to be closed immediately and warning lamp 14 to light up.

In order to ensure a quickest possible response in such a critical case, the count rate has been increased by the application of a control signal respresentative of an inadmissibly high level change of the velocity or acceleration signal to terminal 15 of count clock generator 10, thereby increasing the slope of the curve as indicated in FIG. 2 at 18'.

When the threshold level is reached, the signal "sensor error" will be set.

At the same time, the sensor error will be indicated to the vehicle operator visually, e.g., by warning lamp 13. Because the signals of outlet valves do not occur in this instance and both inlet valves are opened, the composite signal 18 will be reset to zero at a predetermined count rate. During this reset cycle, the indicated signals will remain set.

The signal "sensor error" is set to zero when the reset cycle is concluded, i.e., when composite signal 18 has reached zero value.

If the vehicle is slowed down further and the vehicle speed drops below a predeterminable minimum speed, the visual error indication, e.g., warning lamp 13, will be extinguished provided that the signal "sensor error" is already set to zero.

Depending on whether the error threshold is attained with or without the aid of the signal "sensor error" (increased count rate), it is possible to distinguish between short-duration major signal variations of the two sensors of an axle which disable the antiskid system only temporarily, and a continuous disturbance which disables the antiskid system permanently until the attainment of a predeterminable miminum velocity.

It is to be understood that also other signal combinations are possible, permitting the setting and resetting of the warning lamp or of the signal "sensor error" to be adapted to the prevailing service conditions.

The present invention is based upon the knowledge that, with the antiskid system operable, the curve of the averaged control signal of each wheel of one axle is relatively uniform. If there is a deviation from this curve which exceeds the maximum admissible value, this indicates an error.

In general, it is sufficient to recognize whether there is an error without identifying which wheel sensor or wheel control signal of an axle is faulty because the opening of the outlet valves of both wheels of an axle will be inhibited upon occurrence of an error in the antiskid control system. However, it could be possible to derive from the directions of the deviation (toward the upper threshold or toward the lower threshold) since the signals $A_{V1}$ and $A_{V2}$ are each assigned to a particular wheel and a particular count direction, which one of the two wheels monitored represents the source of error because the faulty sensor or broken wire coupled thereto normally issues no signals at all or only a few pulses.

While we have described above the principles of our invention in connection with specific apparatus, it is to be clearly understood that this description is made only by way of example and not as a limitation to the scope of our invention as set forth in the objects thereof and in the accompanying claims.

We claim:

1. A circuit for monitoring signalling irregularities in an anti-skid system having a brake cylinder for each wheel of a vehicle axle controlled by an inlet valve to control pressure buildup in said cylinder an an outlet valve to control pressure decrease in said cylinder, each of said oulet valves being controlled by repetitive pulse signals generated in response to rotational speed of an associated one of said wheels, said circuit comprising in combination:
   a clock generator for providing repetitive clock signals whose pulse repetition rate is substantially equal to the maximum pulse repetition rate of said pulse signals, said clock generator having first and second inputs respectively receiving said pulse signals from each of said wheels and said clock generator having first and second outputs for respectively providing output signals in response to said clock signals upon the occurrence of said pulse signals;
   an up down staircase signal generator having first and second inputs respectively coupled to said outputs of said clock generator for providing a staircase output signal which rises in magnitude in response to the occurrence of said pulse signals associated with one of said wheels and which decreases in magnitude in response to the occurrence of said pulse signals associated with the other of said wheels;
   a threshold level detector having an input coupled to the output of said staircase signal generator for providing an output signal when the magnitude of said staircase output signal rises above or decreased below predetermined levels; and,
   an indicating device coupled to the output of said threshold level detector and being responsive to said output signal of said threshold level detector.

2. The circuit according to claim 1, including gating means for coupling said pulse signals to the outlet valves of said wheels, said gating means having an input coupled to the output of said threshold level detector for controlling said gating means in response to said output signal of said threshold level detector.

3. The circuit according to claim 1, wherein said clock generator includes a third input for receiving an input signal indicative of an abrupt change in velocity or acceleration of the rotation of said wheels and being responsive to said input signal so that said clock generator provides output signals upon the occurrence of said pulse signals at any time during the periods of said clock signals.

4. A method for monitoring signalling irregularities in an anti-skid system having a brake cylinder for each wheel of a vehicle axle controlled by an inlet valve to control pressure buildup in said cylinder and an outlet valve to control pressure decrease in said cylinder, each of said outlet valves being controlled by repetitive pulse signals generated in response to rotational speed of an associated one of said wheels, said method comprising the steps of:
   providing repetitive clock signals with a clock generator whose pulse repetition rate is substantially equal to the maximum pulse repetition rate of said pulse signals, said clock generator having first and second inputs respectively receiving said pulse signals from each of said wheels and said clock generator having first and second outputs for respectively providing output signals in response to said clock signals upon the occurrence of said pulse signals;
   providing a staircase output signal which rises in magnitude in response to the occurrence of said pulse signals associated with one of said wheels and which decreases in magnitude in response to the occurrence of said pulse signals associated with the other of said wheels;
   detecting said staircase output signal for providing a detected output signal when the magnitude of said staircase output signal rises above or decreases below a predetermined levels; and,
   indicating the presence of said detected output signal.

* * * * *